United States Patent
Okuda et al.

(10) Patent No.: US 8,084,156 B2
(45) Date of Patent: Dec. 27, 2011

(54) COOLING DEVICE AND POWER SUPPLY

(75) Inventors: Jun Okuda, Aichi-gun (JP); Akihiro Aoyama, Osaka (JP)

(73) Assignee: Panasonic EV Energy Co., Ltd., Kosai-Shi, Shizuoka (JP)

( * ) Notice: Subject to any disclaimer, the term of this patent is extended or adjusted under 35 U.S.C. 154(b) by 0 days.

(21) Appl. No.: 13/044,200

(22) Filed: Mar. 9, 2011

(65) Prior Publication Data

US 2011/0159325 A1 Jun. 30, 2011

Related U.S. Application Data

(62) Division of application No. 11/340,255, filed on Jan. 26, 2006, now Pat. No. 7,923,141.

(30) Foreign Application Priority Data

Jan. 28, 2005 (JP) .................. 2005-021941

(51) Int. Cl.
*H01M 10/50* (2006.01)
*H01M 2/12* (2006.01)
*B60K 1/00* (2006.01)

(52) U.S. Cl. ............ 429/120; 429/62; 429/71; 180/65.1

(58) Field of Classification Search .......... 429/120, 429/62, 71; 361/695; 62/259.2, 186, 244; 320/118, 119, 132; 180/68.5, 65.1
See application file for complete search history.

(56) References Cited

U.S. PATENT DOCUMENTS

| | | | |
|---|---|---|---|
| 4,274,262 A | | 6/1981 | Reed et al. |
| 5,937,664 A | * | 8/1999 | Matsuno et al. ............ 62/259.2 |
| 6,094,031 A | * | 7/2000 | Shimane et al. ............ 320/118 |
| 6,220,383 B1 | * | 4/2001 | Muraki et al. ............ 180/68.5 |
| 6,317,320 B1 | | 11/2001 | Cosley et al. |
| 6,662,891 B2 | | 12/2003 | Misu et al. |
| 2002/0182493 A1 | | 12/2002 | Ovshinsky et al. |

(Continued)

FOREIGN PATENT DOCUMENTS

JP 02-146412 6/1990

(Continued)

OTHER PUBLICATIONS

Comair Rotron Electronic Publication: "Air moving solutions made simple", Muffin XL— MD12B5—028885, Comair Rotron Specification. Retrieved online Jun. 19, 2010 http://www.comairrotron.com.

(Continued)

*Primary Examiner* — Jonathan Crepeau
*Assistant Examiner* — Kenneth Douyette
(74) *Attorney, Agent, or Firm* — Workman Nydegger

(57) ABSTRACT

A cooling device including an intake duct achieving fluid communication between a vehicle interior and an inner part of a battery case, a fan unit for supplying the air via the intake duct to the inner part of the battery case, and a control device is used. The fan unit includes a fan and a motor driven by a constant voltage system. The control device includes a current value detecting portion and a judging portion. The current value detecting portion detects a current value of an electric current supplied to the motor. The judging portion compares the detected current value and a preset reference current value and, when the detected current value is lower than the reference current value, judges that there is an anomaly in a volume of the air supplied to the battery case.

2 Claims, 10 Drawing Sheets

U.S. PATENT DOCUMENTS

2003/0118891 A1    6/2003    Saito et al.

FOREIGN PATENT DOCUMENTS

| | | |
|---|---|---|
| JP | 06-098589 | 4/1994 |
| JP | 08-257332 | 10/1996 |
| JP | 10-284136 | 10/1998 |
| JP | 2001-354039 | 12/2001 |
| JP | 2002-120568 | 4/2002 |
| JP | 2002-147863 | 5/2002 |
| JP | 2004-136767 | 5/2004 |
| JP | 2005-021941 | 3/2011 |

OTHER PUBLICATIONS

Morningstar Corporation, "What is PWM?", 14th NREL Photovoltaic program Review, Nov. 1996.

* cited by examiner

COOLING DEVICE AND POWER SUPPLY

BACKGROUND OF THE INVENTION

1. Field of the Invention

The present invention relates to a cooling device for cooling a battery for running mounted on a vehicle such as a hybrid car, and a power supply including the same.

2. Description of Related Art

In recent years, hybrid electric vehicles (in the following, referred to as hybrid cars) on which an engine and a motor are mounted as a driving source have been commercialized and attracted attention. A hybrid car includes a secondary battery (a power supply) as a power source for supplying an electric power to a driving motor. In this secondary battery, charging or discharging is conducted according to the state of running of the vehicle.

Further, the secondary battery to be mounted on the hybrid car generates a large amount of heat because it is a combination of many single cells. Also, an electrochemical reaction at the time of charging or discharging in the secondary battery depends on a temperature. Thus, when the temperature of the secondary battery exceeds a particular temperature, there arise problems of deteriorating performance of the secondary battery and a shortened lifetime thereof. Accordingly, as shown in JP 2002-120568 A, JP 2001-354039 A and JP 2004-136767 A, the power supply in the hybrid car conventionally has included a cooling device for cooling the battery.

FIG. 10 is a sectional view showing a configuration of a conventional power supply. The power supply shown in FIG. 10 includes a battery pack 110 and a cooling device. The cooling device supplies an air to an inner part of the battery pack 110 and cools the battery pack 110 with the supplied air.

More specifically, the battery pack 110 has a configuration in which a plurality of unit cells 111 are disposed in a battery case 112. The battery case 112 is provided with a supply port 113 for supplying the air to its inner part and an exhaust port 114 for discharging the air after heat exchange. Furthermore, gaps are provided between the adjacent unit cells 111 and between each unit cell 111 and an inner surface of the battery case 112 and serve as a passage for the supplied air.

The cooling device includes an intake duct 101, an exhaust duct 102 and a fan unit 103. The intake duct 101 connects the supply port 113 of the battery case 112 and an air inlet 109 provided in an interior material 108 of the vehicle. Also, at an opening of the intake duct 101 on the side of the air inlet 109, a filter member 107 is disposed for preventing the entry of foreign objects into the battery pack 110.

The exhaust duct 102 connects the exhaust port 114 of the battery case 112 and a suction port 103a of the fan unit 103. The fan unit 103 includes a housing 106, a fan 104 disposed in the housing 106 and a motor 105 for driving the fan 104. The housing 106 is provided with the suction port 103a and an exhaust port 103b.

When the fan 104 is driven by the motor 105, the air in a vehicle interior is supplied through the intake duct 101 to the inner part of the battery case 112, so that the temperature rise in each of the unit cells 111 is suppressed. Further, the air that has been warmed up by the unit cells 111 passes through the exhaust duct 102 and is released from the exhaust port 103b provided in the housing 106 of the fan unit 103 to the outside of the vehicle.

Moreover, the cooling device shown in FIG. 10 includes a control device 120. The control device 120 includes a judging portion 121, a motor driving portion 122 and a temperature detecting portion 123 and switches a fan speed of the fan 104 between multiple stages (for example, "LOW", "MIDDLE" and "HIGH") according to the temperature of the unit cell 111. The motor 105 is driven by a constant voltage system.

More specifically, the temperature detecting portion 123 detects the temperature of the unit cell 111 based on a signal from a temperature sensor 124 attached to the unit cell 111. The judging portion 121 judges whether the present fan speed is suitable for the detected temperature.

If not, the judging portion 121 selects a fan speed suitable for the detected temperature. In this case, the judging portion 121 further outputs a signal (a fan speed indicating signal) to the motor driving portion 122 so that a voltage corresponding to the selected fan speed is applied to the motor 105.

The motor driving portion 122 switches the voltage applied to the motor 105 between multiple stages according to the indication of the judging portion 121 so as to adjust the fan speed of the fan 104 in stages. Thus, in the case where the judging portion 121 outputs the fan speed indicating signal, the motor driving portion 122 switches the voltage so that the fan 104 rotates at the selected fan speed.

In this manner, the control device 120 operates the fan 104 while switching the fan speed between multiple stages so that the temperature of the unit cell 111 does not exceed a preset threshold, and suppresses the temperature rise of the unit cell 111.

In the above-described conventional power supply illustrated in FIG. 10, the filter member 107 becomes clogged with the passage of operation time of the fan 104. Accordingly, the volume of the air supplied to the inner part of the battery case 112 (in the following, referred to as a "supply air volume") also decreases gradually with the passage of operation time of the fan 104. If such a situation is left unaddressed, it becomes impossible to suppress the temperature rise of the unit cell 111 even by operating the fan 104. This deteriorates the performance of the unit cell 111 and shortens the lifetime thereof.

Furthermore, there also are some cases where the supply air volume decreases due to a cause other than the clogging of the filter member 107, for example, where a foreign object blocks the air inlet 109 or a foreign object staves in the filter member 107 and intrudes into the intake duct 101. In these cases, the temperature rise cannot be suppressed, which deteriorates the performance of the unit cell 111 and shortens the lifetime thereof, similarly to the case where the filter member 107 is clogged. Consequently, in the above-described conventional power supply illustrated in FIG. 10, it is necessary to monitor the dogging of the filter member 107 and the decrease in the supply air volume due to foreign objects.

Also, in the field of air conditioning equipment such as a warm-air heater, an air conditioner that senses the filter clogging automatically has been known. For example, JP 2002-147863 A discloses a method for sensing a filter dogging in a warm-air heater based on the amount of changes in a control value of a fan motor when the filter is not clogged (a reference control value) and a control value of the fan motor outputted for maintaining the number of revolutions of the fan to a target number of revolutions.

However, in the above-described conventional power supply illustrated in FIG. 10, the control device 120 has only the function of detecting the temperature of the unit cell 111 and no function of sensing a decrease in the supply air volume due to clogging or the like of the filter member 107. Therefore, it is not until the temperature of the unit cell 111 rises that a user realizes the clogging of the filter member 107 or the presence of a foreign object in the intake duct 101. Also, after the temperature of the unit cell 111 rises, the performance deterioration of the unit cell 111 and the shortening of the lifetime thereof already might be caused.

On the other hand, if a user periodically cleans or replaces the filter member 107 or carries out an inspection in the air inlet 109 and the intake duct 101, the above-mentioned problems can be avoided. However, it is up to a user to do such a work, and a user conceivably might fail to do such a work.

Further, applying the method disclosed in JP 2002-147863 A to the above-described conventional power supply illustrated in FIG. 10 also can be considered. However, in this case, the number of revolutions of the fan has to be sensed, leading to an increase in the cost of the power supply. Moreover, in order to obtain the control value of the motor 105, it is necessary to control the motor 105 by the control method disclosed in JP 2002-147863 A, which also increases the cost of the power supply.

It is an object of the present invention to solve the problems described above and to provide a cooling device capable of sensing an anomaly in a supply air volume due to dogging of a filter provided in an air supply channel in a battery mounted on a vehicle or a foreign object, and a power supply including the same.

SUMMARY OF THE INVENTION

In order to achieve the above-mentioned object, a first cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, and a control system. The air supply system includes a fan and a motor for driving the fan, and the motor is driven by a constant voltage system. The control system includes a current value detecting portion and a judging portion. The current value detecting portion detects a current value of an electric current supplied to the motor, and the judging portion compares the current value detected by the current value detecting portion and a preset reference current value and, when the detected current value is lower than the reference current value, judges that there is an anomaly in a volume of the air supplied to the battery case.

In the first cooling device described above, the anomaly in a supply air volume is judged utilizing the electric current value supplied to the motor. Therefore, the first cooling device can judge the anomaly in the supply air volume with a simple configuration.

In order to achieve the above-mentioned object, a second cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, a control system, and an air volume measuring system for measuring a volume of the air supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages, the memory portion stores a reference air volume obtained in advance by measuring the actual volume of the air supplied to the inner part of the battery case when the fan is driven at each of the stages of the fan speed, and the judging portion calculates a difference between the reference air volume corresponding to the fan speed of the fan at constant time intervals or at all times and the air volume measured by the air volume measuring system at that time and, when the calculated difference is equal to or larger than a preset tolerance value, judges that there is an anomaly in the volume of the air supplied to the battery case.

In the second cooling device described above, the anomaly in the supply air volume is judged utilizing an actual measured value of the supply air volume. Therefore, the second cooling device can increase the accuracy in the anomaly judgment in the supply air volume.

In order to achieve the above-mentioned object, a third cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, a control system, and an air volume measuring system for measuring a volume of the air supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion determines an operation time of the fan, calculates a first accumulated air volume using the reference air volume and the operation time of the fan, calculates a second accumulated air volume using the air volume measured by the air volume measuring system and the operation time of the fan, calculates a difference between the first accumulated air volume and the second accumulated air volume and, when the calculated difference is equal to or larger than a preset range, judges that there is an anomaly in the volume of the air supplied to the battery case.

In the third cooling device described above, the anomaly in the supply air volume is judged by comparing an expected value and an actual measured value of the accumulated air volume of the air supplied to the battery case. Therefore, the third cooling device also can increase the accuracy in the anomaly judgment in the supply air volume.

In order to achieve the above-mentioned object, a fourth cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, a filter member, and a control system. The filter member is disposed so that only the air that has passed through the filter member is supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion determines an operation time of the fan, calculates an accumulated air volume using the reference air volume and the operation time of the fan and, when the calculated accumulated air volume is equal to or larger than a preset reference accumulated air volume, judges that there is an anomaly in the volume of the air supplied to the battery case.

In the fourth cooling device described above, the anomaly in the supply air volume is judged by comparing the accumulated air volume calculated from the fan speed and the operation time and the reference accumulated air volume serving as an indicator of when to replace or clean the filter member. Therefore, the fourth cooling device can increase the reliability of avoiding the temperature rise of the battery.

In order to achieve the above-mentioned object, a first power supply according to the present invention includes a battery mounted on a vehicle, and a cooling device for cooling the battery. The battery includes a plurality of unit cells and a battery case containing the plurality of unit cells. The cooling device includes an air supply channel achieving fluid communication between a vehicle interior or an outside of the vehicle and an inner part of the battery case, an air supply system for supplying air via the air supply channel to the inner part of the battery case, and a control system. The air supply system includes a fan and a motor for driving the fan, and the motor is driven by a constant voltage system. The control system includes a current value detecting portion and a judging portion, the current value detecting portion detects a current value of an electric current supplied to the motor, and the judging portion compares the current value detected by the current value detecting portion and a preset reference current value and, when the detected current value is lower than the reference current value, judges that there is an anomaly in a volume of the air supplied to the battery case.

In order to achieve the above-mentioned object, a second power supply according to the present invention includes a battery mounted on a vehicle, and a cooling device for cooling the battery. The battery includes a plurality of unit cells and a battery case containing the plurality of unit cells. The cooling device includes an air supply channel achieving fluid communication between a vehicle interior or an outside of the vehicle and an inner part of the battery case, an air supply system for supplying air via the air supply channel to the inner part of the battery case, a control system, and an air volume measuring system for measuring a volume of the air supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion calculates a difference between the reference air volume corresponding to the fan speed of the fan at constant time intervals or at all times and the air volume measured by the air volume measuring system at that time and, when the calculated difference is equal to or larger than a preset tolerance value, judges that there is an anomaly in the volume of the air supplied to the battery case.

Further, in order to achieve the above-mentioned object, a third power supply according to the present invention includes a battery mounted on a vehicle, and a cooling device for cooling the battery. The battery includes a plurality of unit cells and a battery case containing the plurality of unit cells. The cooling device includes an air supply channel achieving fluid communication between a vehicle interior or an outside of the vehicle and an inner part of the battery case, an air supply system for supplying air via the air supply channel to the inner part of the battery case, a control system, and an air volume measuring system for measuring a volume of the air supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion determines an operation time of the fan, calculates a first accumulated air volume using the reference air volume and the operation time of the fan, calculates a second accumulated air volume using the air volume measured by the air volume measuring system and the operation time of the fan, calculates a difference between the first accumulated air volume and the second accumulated air volume and, when the calculated difference is equal to or larger than a preset range, judges that there is an anomaly in the volume of the air supplied to the battery case.

Also, in order to achieve the above-mentioned object, a fourth power supply according to the present invention includes a battery mounted on a vehicle, and a cooling device for cooling the battery. The battery includes a plurality of unit cells and a battery case containing the plurality of unit cells. The cooling device includes an air supply channel achieving fluid communication between a vehicle interior or an outside of the vehicle and an inner part of the battery case, an air supply system for supplying air via the air supply channel to the inner part of the battery case, a filter member, and a control system. The filter member is disposed so that only the air that has passed through the filter member is supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion determines an operation time of the fan, calculates an accumulated air volume using the reference air volume and the operation time of the fan and, when the calculated accumulated air volume is equal to or larger than a preset reference accumulated air volume, judges that there is an anomaly in the volume of the air supplied to the battery case.

As described above, the cooling device and the power supply according to the present invention can sense the anomaly in the volume of the cooling air supplied to the battery (the supply air volume). Thus, a user realizes the clogging of the filter member and the presence of foreign objects before the temperature of the battery rises. Consequently, it becomes possible to avoid the performance deterioration of the battery and the lifetime shortening thereof, which are caused by the temperature rise. Also, with the cooling device and the power supply according to the present invention, the anomaly in the supply air volume can be sensed at low cost.

DETAILED DESCRIPTION OF THE INVENTION

Figure 1:
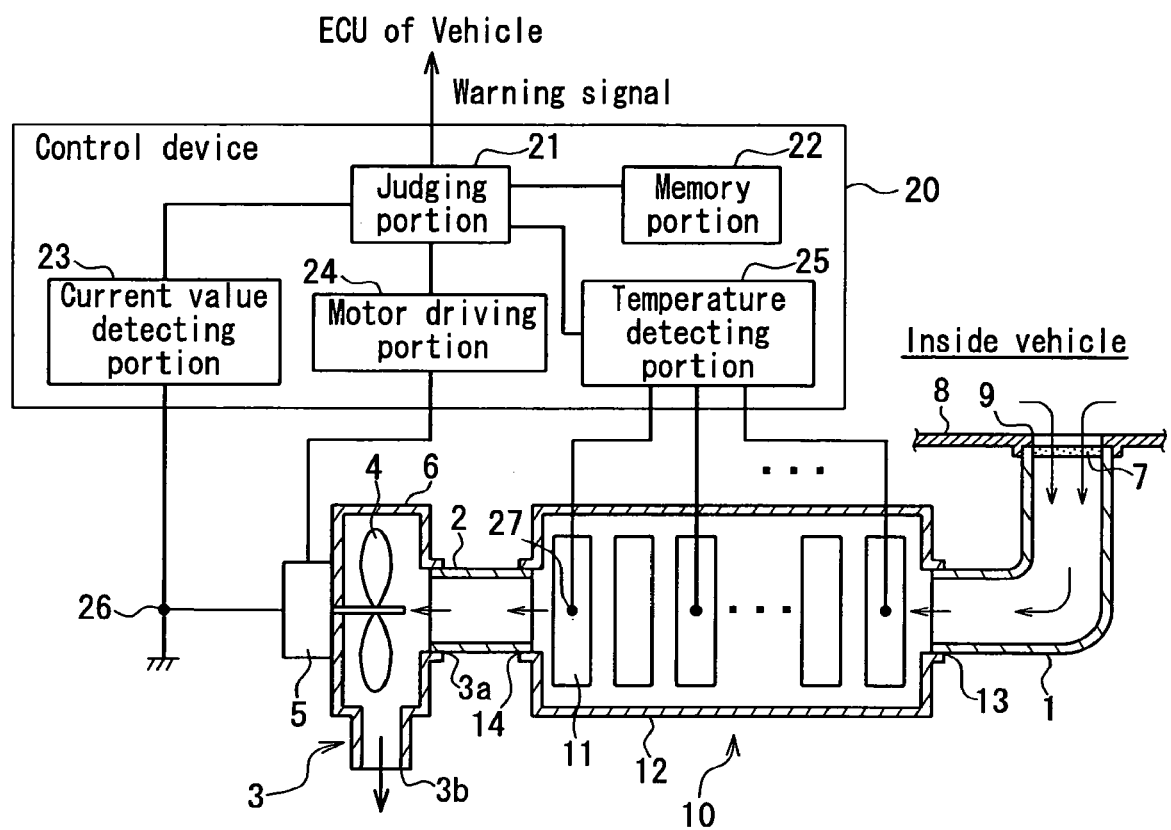
FIG. 1 is a sectional view showing a schematic configuration of a cooling device and a power supply in Embodiment 1 of the present invention.

A first cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, and a control system. The air supply system includes a fan and a motor for driving the fan, and the motor is driven by a constant voltage system. The control system includes a current value detecting portion and a judging portion. The current value detecting portion detects a current value of an electric current supplied to the motor, and the judging portion compares the current value detected by the current value detecting portion and a preset reference current value and, when the detected current value is lower than the reference current value, judges that there is an anomaly in a volume of the air supplied to the battery case.

In the above-described first cooling device according to the present invention, it is preferable that a filter member further is provided. The filter member is disposed so that only the air that has passed through the filter member is supplied to the inner part of the battery case, and the reference current value is set based on the current value of the electric current supplied to the motor when the fan is driven while an unused filter member is provided.

Also, a second cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, a control system, and an air volume measuring system for measuring a volume of the air supplied to the inner part of the battery case. The air supply system includes a fan and a motor, for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion calculates a difference between the reference air volume corresponding to the fan speed of the fan at constant time intervals or at all times and the air volume measured by the air volume measuring system at that time and, when the calculated difference is equal to or larger than a preset tolerance value, judges that there is an anomaly in the volume of the air supplied to the battery case.

Further, a third cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, a control system, and an air volume measuring system for measuring a volume of the air supplied to the inner part of the battery case. The air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion determines an operation time of the fan, calculates a first accumulated air volume using the reference air volume and the operation time of the fan, calculates a second accumulated air volume using the air volume measured by the air volume measuring system and the operation time of the fan, calculates a difference between the first accumulated air volume and the second accumulated air volume and, when the calculated difference is equal to or larger than a preset range, judges that there is an anomaly in the volume of the air supplied to the battery case.

In the above-described second and third cooling devices according to the present invention, it is preferable that a filter member further is provided, and the filter member is disposed so that only the air that has passed through the filter member is supplied to the inner part of the battery case.

Moreover, in the above-described third cooling device according the present invention, it is preferable that when the fan is driven at different fan speeds, the operation time of the fan is determined for each of the different fan speeds, and the first accumulated air volume is calculated by the judging portion by calculating an accumulated air volume for each of the different fan speeds from the determined operation time of the fan for each of the different fan speeds and the reference air volume corresponding to this fan speed and adding together the calculated accumulated air volumes for the different fan speeds.

A fourth cooling device according to the present invention is a cooling device for cooling a battery contained in a battery case and mounted on a vehicle, including an air supply channel achieving fluid communication between a vehicle interior or an outside of the vehicle and an inner part of the battery case, an air supply system for supplying air via the air supply channel to the inner part of the battery case, a filter member, and a control system. The filter member is disposed so that only the air that has passed through the filter member is supplied to the inner part of the battery case, the air supply system includes a fan and a motor for driving the fan, and the control system includes a motor driving portion, a memory portion and a judging portion. The motor driving portion switches a voltage applied to the motor between multiple stages according to an indication of the judging portion so as to adjust a fan speed of the fan in stages. The memory portion stores a reference air volume obtained in advance by measuring the actual volume of the air supplied to the inner part of the battery case when the fan is driven at each of the stages of the fan speed, and the judging portion determines an operation time of the fan, calculates an accumulated air volume using the reference air volume and the operation time of the fan and, when the calculated accumulated air volume is equal to or larger than a preset reference accumulated air volume, judges that there is an anomaly in the volume of the air supplied to the battery case.

Moreover, in the above-described fourth cooling device according the present invention, it is preferable that when the fan is driven at different fan speeds, the accumulated air volume is calculated by the judging portion by determining the operation time of the fan for each of the different fan speeds, calculating an accumulated air volume for each of the different fan speeds from the determined operation time of the fan for each of the different fan speeds and the reference air volume corresponding to this fan speed and adding together the calculated accumulated air volumes for the different fan speeds. It is further preferable that the reference accumulated air volume is set to an accumulated air volume from a time when the filter member in an unused state is disposed and the fan starts to be driven at a constant fan speed until an actual measured value of the volume of the air supplied to the inner part of the battery case becomes 80% or smaller of the volume of the air at the time when the fan starts to be driven.

Additionally, a power supply according to the present invention is characterized by having a battery mounted on a vehicle and any of the above-described first to fourth cooling devices according to the present invention.

Embodiment 1

Figure 2:
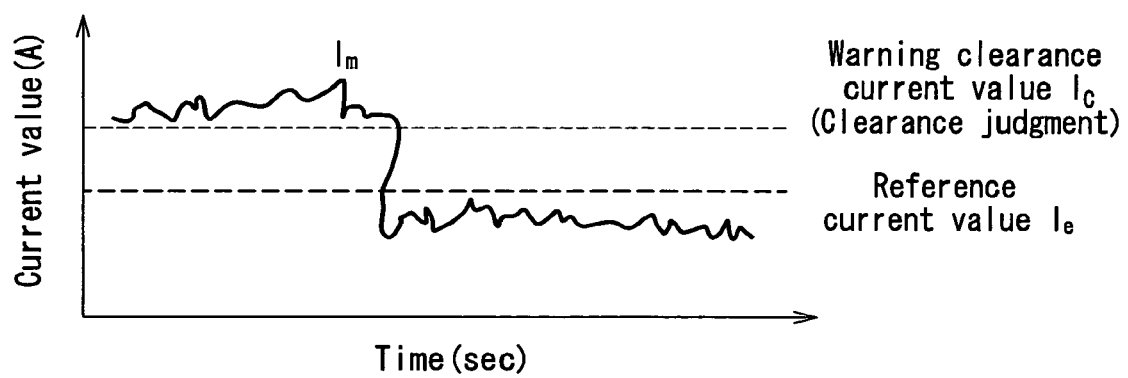
FIG. 2 shows how an electric current supplied to a motor varies in the case where an anomaly occurs in a supply air volume.
Figure 3:
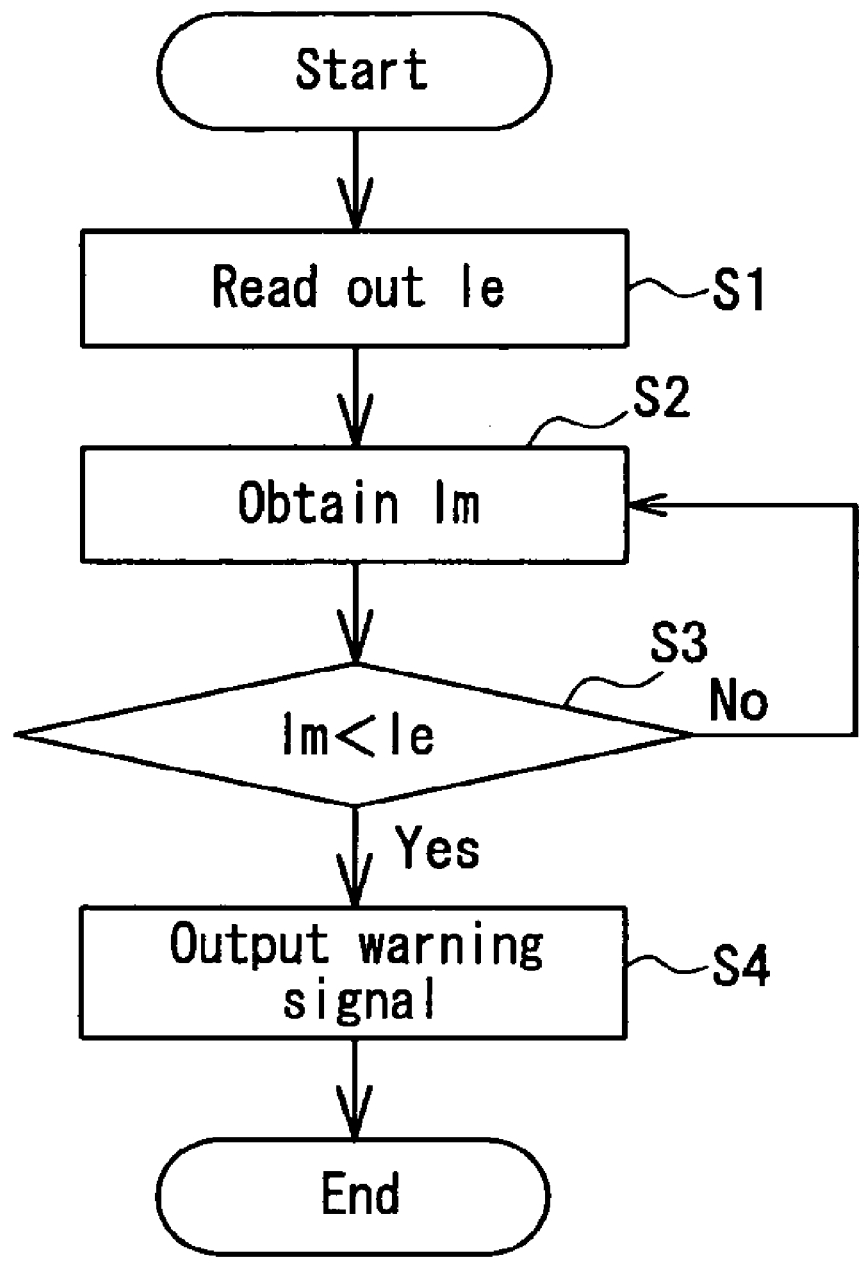
FIG. 3 is a flowchart showing an operation of a control device constituting the cooling device in Embodiment 1 of the present invention.

The following is a description of a cooling device and a power supply in Embodiment 1 of the present invention, with reference to FIGS. 1 to 3. FIG. 1 is a sectional view showing a schematic configuration of the cooling device and the power supply in Embodiment 1 of the present invention.

As shown in FIG. 1, the power supply includes a battery pack 10 to be mounted on a vehicle such as a hybrid car, and a cooling device. The cooling device supplies a cooling air into the battery pack 10 similarly to the conventional cooling device illustrated in FIG. 10. In Embodiment 1, as shown in FIG. 1, the battery pack 10 includes a plurality of unit cells 11 and a battery case 12. Each of the unit cells 11 is a nickel metal-hydride storage battery or a lithium ion storage battery. Also, a plurality of the unit cells 11 are received in the battery case 12. It should be noted that, in the present invention, the unit cell 11 may be a cell or constituted by a plurality of cells.

The battery case 12 is provided with a supply port 13 for supplying the cooling air to its inner part and an exhaust port 14 for discharging the air after heat exchange. Furthermore, gaps are provided between the adjacent unit cells 11 and between each unit cell 11 and an inner surface of the battery case 12 and serve for passage of the supplied air.

The cooling device includes an intake duct 1, an exhaust duct 2, a fan unit 3 and a control device 20. The intake duct 1 achieves fluid communication between an inside of the vehicle and the inner part of the battery case 12 and functions as an air supply channel for supplying the air inside of the vehicle to the battery case. In Embodiment 1, the intake duct 1 connects the supply port 13 of the battery case 12 and an air inlet 9 provided in an interior material 8 of the vehicle.

Also, in Embodiment 1, at an opening of the intake duct 1 on the side of the air inlet 9, a filter member 7 is disposed for preventing the entry of foreign objects into the battery pack 10. The filter member 7 is disposed so that only the air that has passed through the filter member 7 is supplied to the inner part of the battery case 12.

The exhaust duct 2 functions as an air exhaust channel for exhausting the air from the battery case 12. In Embodiment 1, the exhaust duct 2 connects the exhaust port 14 of the battery case 12 and a suction port 3a of the fan unit 3. The air after heat exchange is sent via the exhaust duct 2 to the fan unit 3 and discharged through an exhaust port 3b of the fan unit 3 to the outside of the vehicle.

The fan unit 3 functions as an air supply system for supplying the air via the intake duct 1 to the inner part of the battery case 12. Also, the fan unit 3 includes, a fan 4, a motor 5 for driving the fan 4 and a housing 6 receiving the fan 4. The suction port 3a and the exhaust port 3b of the fan unit 3 are provided in the housing 6.

In Embodiment 1, the suction port 3a of the fan unit 3 is connected to the exhaust duct 2 as described above. Therefore, when the fan 4 is driven by the motor 5, the air inside the battery case 12 is drawn, whereby the air inside the vehicle is supplied to the inner part of the battery case 12.

The control device 20 includes a judging portion 21, a memory portion 22, a current value detecting portion 23, a motor driving portion 24 and a temperature detecting portion 25. Similarly to the temperature detecting portion 123 shown in FIG. 10, the temperature detecting portion 25 detects the temperature of the unit cell 11 based on a signal from a temperature sensor 27 attached to the unit cell 11. Also, the temperature detecting portion 25 outputs a signal specifying the detected temperature to the judging portion 21.

Figure 10:
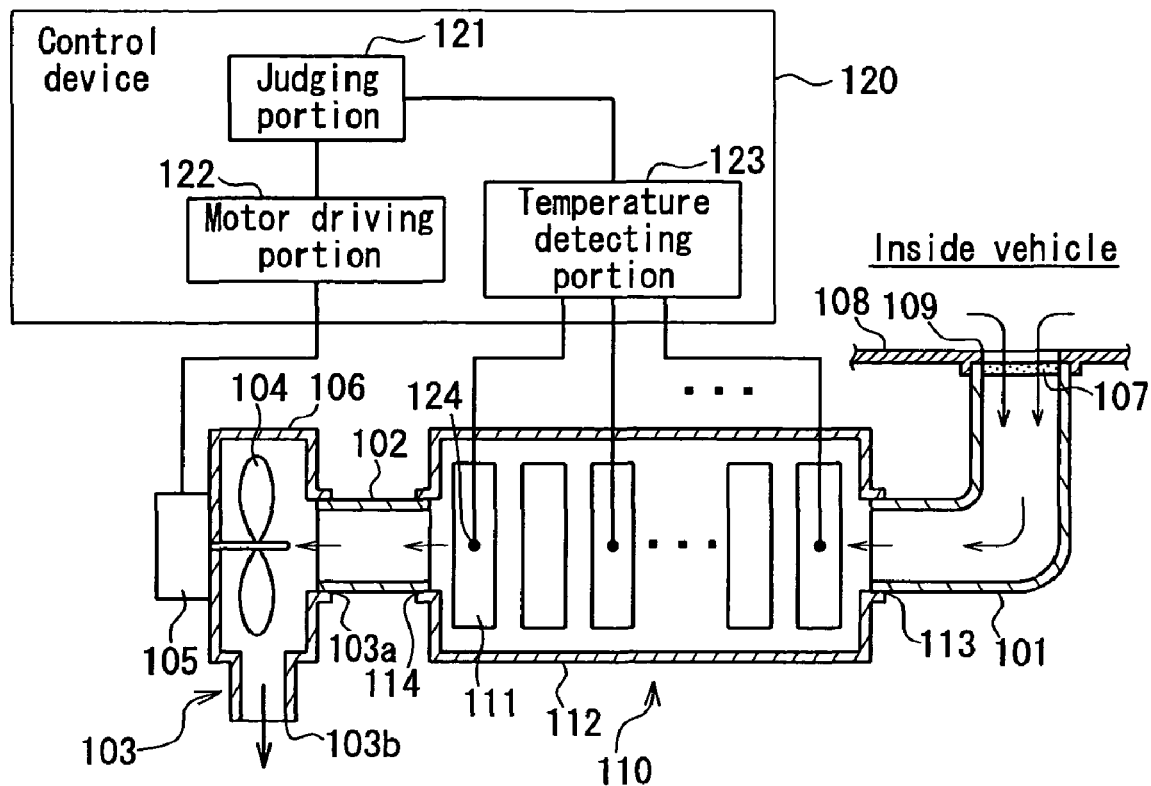
FIG. 10 is a sectional view showing a configuration of a conventional power supply.

The judging portion 21 judges whether the present fan speed is suitable for the detected temperature similarly to the judging portion 121 shown in FIG. 10. If not, the judging portion 21 selects a fan speed suitable for the detected temperature. In this case, the judging portion 21 further outputs a signal (a fan speed indicating signal) to the motor driving portion 24 so that a voltage corresponding to the selected fan speed is applied to the motor 5.

Similarly to the motor driving portion 122 shown in FIG. 10, the motor driving portion 24 switches the voltage applied to the motor 5 between multiple stages according to the indication of the judging portion 21 so as to adjust the fan speed of the fan 4 in stages. In the case where the judging portion 21 outputs the fan speed indicating signal, the motor driving portion 24 applies the voltage corresponding to the selected fan speed to the motor 5. In this way, the fan 4 rotates at the selected fan speed. It should be noted that the motor 5 is driven by a constant voltage system. Accordingly, as long as the fan speed indicating signal is not inputted to the motor driving portion 24, the present voltage is maintained, so that a constant voltage is applied to the motor 5.

As described above, similarly to the conventional example illustrated in FIG. 10, the control device 20 switches the voltage applied to the motor 5 between multiple stages according to the temperature of the unit cell 11 so as to adjust the fan speed of the fan 4 in stages. However, unlike the conventional example illustrated in FIG. 10, the judging portion 21 can judge whether there is an anomaly in the volume of the air supplied to the inner part of the battery case 12 (the supply air volume) using the memory portion 22 and the current value detecting portion 23 in Embodiment 1.

Here, referring to FIG. 2, the principle of the anomaly judgment in the supply air volume in Embodiment 1 will be described. FIG. 2 shows how an electric current supplied to the motor varies in the case where an anomaly occurs in the supply air volume. For example, when the filter member 7 becomes clogged considerably, a foreign object blocks the air inlet 9 or a foreign object intrudes in the intake duct 1, the load on the motor 5 decreases. At this time, since the motor 5 is driven on the constant voltage system as described above, a current value Im of the electric current supplied to the motor 5 drops as shown in FIG. 2.

Thus, in Embodiment 1, a threshold (a reference current value Ie) is preset to the electric current supplied to the motor 5, and the judging portion 21 is made to compare the current value Im and the reference current value Ie, thereby judging whether there is any anomaly in the supply air volume.

Incidentally, in Embodiment 1, the reference current value Ie is stored in the memory portion 22. Also, the current value Im is detected by the current value detecting portion 23 based on a signal sent from the current sensor 26 to the current value detecting portion 23. The current value detecting portion 23 outputs a signal specifying the detected current value Im to the judging portion 21 (see FIG. 1).

Referring to FIG. 3, the processing of the anomaly judgment in the supply air volume in the control device 20 will be described. FIG. 3 is a flowchart showing an operation of the control device constituting the cooling device in Embodiment 1 of the present invention.

As shown in FIG. 3, the judging portion 21 first reads out the reference current value Ie from the memory portion 22 (Step S1). Next, the judging portion 21 obtains the current value Im based on the signal from the current value detecting portion 23 (Step S2). Further, the judging portion 21 compares the current value Im and the reference current value Ie (Step S3).

If the current value Im is not judged to be smaller than the reference current value Ie in Step S3, the judging portion 21 executes Step S2 again. It should be noted that the re-execution of Step S2 following Step S3 can be carried out after a certain time period.

On the other hand, if the current value Im is judged to be smaller than the reference current value Ie in Step S3, the judging portion 21 judges that there is an anomaly in the supply air volume, and outputs a warning signal to the ECU (electronic control unit) of the vehicle as shown in FIG. 1 (Step S4). When the warning signal is outputted, the ECU of the vehicle warns a driver with a liquid crystal display attached to a meter panel or the like or a warning lamp in the vehicle, for example. Incidentally, the ECU of the vehicle is omitted from FIG. 1.

As described above, the cooling device and the power supply in Embodiment 1 monitor an anomaly in the supply air volume based on the current value supplied to the motor. Thus, unlike the conventional cooling device and power supply, the cooling device and the power supply in Embodiment 1 can sense a cooling air shortage before the temperature of the unit cell 11 rises. Consequently, it is possible to avoid the deterioration in the performance of the unit cell 11 and the shortening of the lifetime thereof due to temperature rise.

It should be noted that the supply air volume recovers if the foreign object that has blocked the air inlet 9 is removed, for example, after the judging portion 21 outputs the warning signal. Thus, Embodiment 1 also may be in a mode allowing the control device 20 to clear the warning when the supply air volume has recovered. More specifically, a current value serving as a warning clearance condition (a warning clearance current value) Ic is set in advance (see FIG. 2) and stored in the memory portion 22. When the current value Im exceeds the warning clearance current value Ic, the judging portion 21 outputs a signal instructing the warning clearance to the ECU of the vehicle.

Also, in Embodiment 1, the reference current value Ie is set as follows, for example. First, after an unused filter member 7 is provided, the fan 4 is driven by the motor driving portion 24. Next, a current value of an electric current supplied to the motor at this time is obtained by the current value detecting portion 23. Then, the memory portion 22 stores −10% to +10% of the obtained current value as the reference current value Ie.

Incidentally, driving the fan 4, obtaining the current value and storing the reference current value Ie described above are conducted for each fan speed. Also, the reference current value Ie may be set before the shipment of the product or every time the filter member 7 is replaced. Further, based on an indicator separately presented by a manufacturer, a user also may set an arbitrary current value as the reference current value Ie. Moreover, it is preferable that the reference current value Ie is set under a certain environmental condition (for example, under the condition that the temperature is kept at 25° C.) while spending a preset time period (for example, 24 hours).

Embodiment 2

Figure 4:
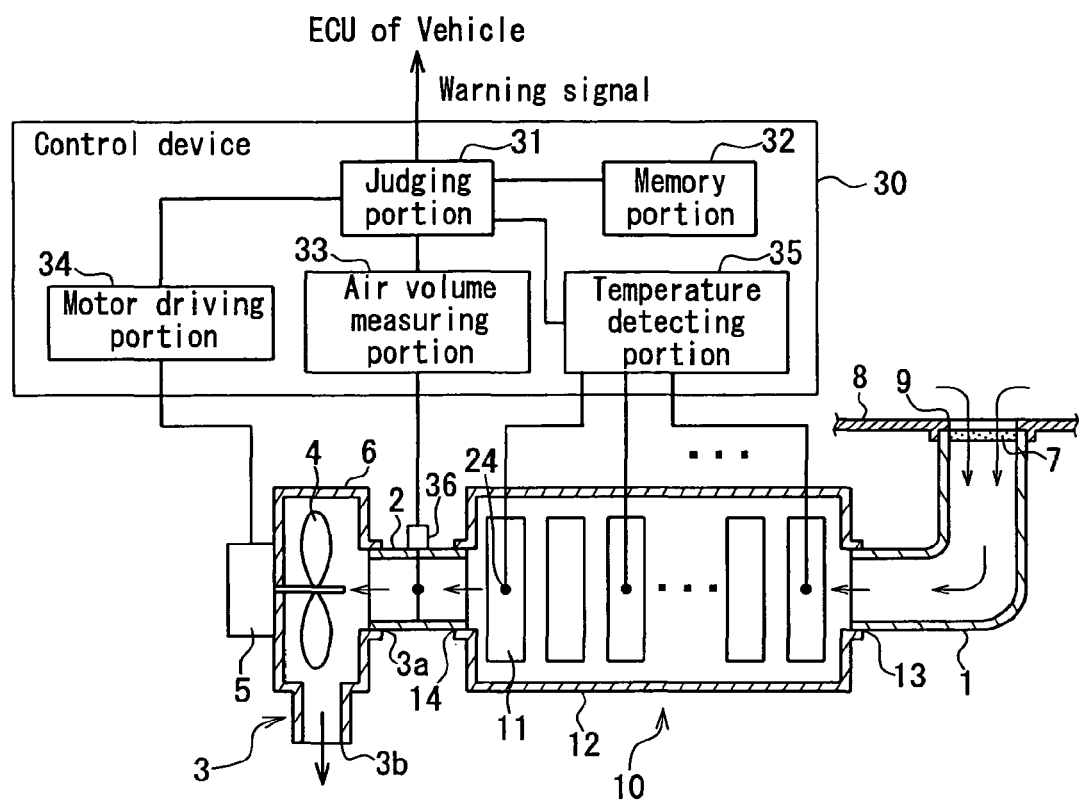
FIG. 4 is a sectional view showing a schematic configuration of a cooling device and a power supply in Embodiment 2 of the present invention.

Now, a cooling device and a power supply in Embodiment 2 of the present invention will be described, with reference to FIGS. 4 and 5. FIG. 4 is a sectional view showing a schematic configuration of the cooling device and the power supply in Embodiment 2 of the present invention.

As shown in FIG. 4, similarly to Embodiment 1, the power supply in Embodiment 2 also includes a battery pack 10 and a cooling device for supplying cooling air into the battery pack 10. Also, the cooling device includes an intake duct 1, an exhaust duct 2, a fan unit 3 and a control device 30 similarly to Embodiment 1.

Further, the control device 30 includes a judging portion 31, a temperature detecting portion 35 and a motor driving portion 34 similarly to Embodiment 1. With this configuration, the control device 30 switches the voltage applied to a motor 5 between multiple stages according to the temperature of a unit cell 11 so as to adjust the fan speed of a fan 4 in stages.

However, unlike Embodiment 1, an air volume sensor 36 is provided in the exhaust duct 2 in Embodiment 2, as shown in FIG. 4. Further, the control device 30 is provided with an air volume measuring portion 33. The air volume sensor 36 and the air volume measuring portion 33 function as an air volume measuring system for measuring the volume of the air supplied to a battery case 12.

More specifically, the air volume sensor 36 outputs to the air volume measuring portion 33 a signal specifying a flow velocity of the air passing through the exhaust duct 2. The air volume measuring portion 33 calculates an air volume Vr per unit time from the signal from the air volume sensor 36 and the cross-sectional area of an inner part of the exhaust dust. The air volume Vr corresponds to an actual measured value of the volume of the air supplied to the inner part of the battery case 12 (the supply air volume). Also, the air volume measuring portion 33 outputs a signal specifying the calculated air volume Vr to the judging portion 31.

Unlike the memory portion 22 shown in FIG. 1, a memory portion 32 stores reference air volumes V1 to Vn for respective stages of the fan speed. Each of the reference air volumes V1 to Vn is an air volume obtained by measuring the actual volume of the air supplied to the inner part of the battery case 12 when the fan 4 is driven at each fan speed. For example, in the case where three stages of "LOW", "MIDDLE" and "HIGH" are set as the fan speeds, the reference air volumes V1 to V3 are measured actually, and the actual measured values are stored individually. Incidentally, the reference air volumes V1, V2 and V3 respectively correspond to the fan speeds "LOW", "MIDDLE" and "HIGH".

In Embodiment 2, the reference air volume is measured actually in the state where an unused filter member 7 is provided. Further, although the actual measurement of the reference air volume preferably is conducted using the air volume sensor 36 as described above, it also may be conducted with a separate air volume measuring device placed in the intake duct 1 or the exhaust duct 2. The reference air volume corresponds to the volume of the air actually supplied to the battery case 12 when the fan 4 is driven in the state where the filter member 7 is not clogged.

Also, in Embodiment 2, the judging portion 31 judges whether there is an anomaly in the supply air volume by comparing the air volume Vr obtained from the air volume sensor 36 and the air volume measuring portion 33 when a vehicle is running and a reference air volume Vm corresponding to the fan speed at this time ($1 \leq m \leq n$). Here, referring to FIG. 5, a processing of the anomaly judgment in the supply air volume in the control device 30 will be described. FIG. 5 is a flowchart showing an operation of the control device constituting the cooling device in Embodiment 2 of the present invention.

Figure 5:
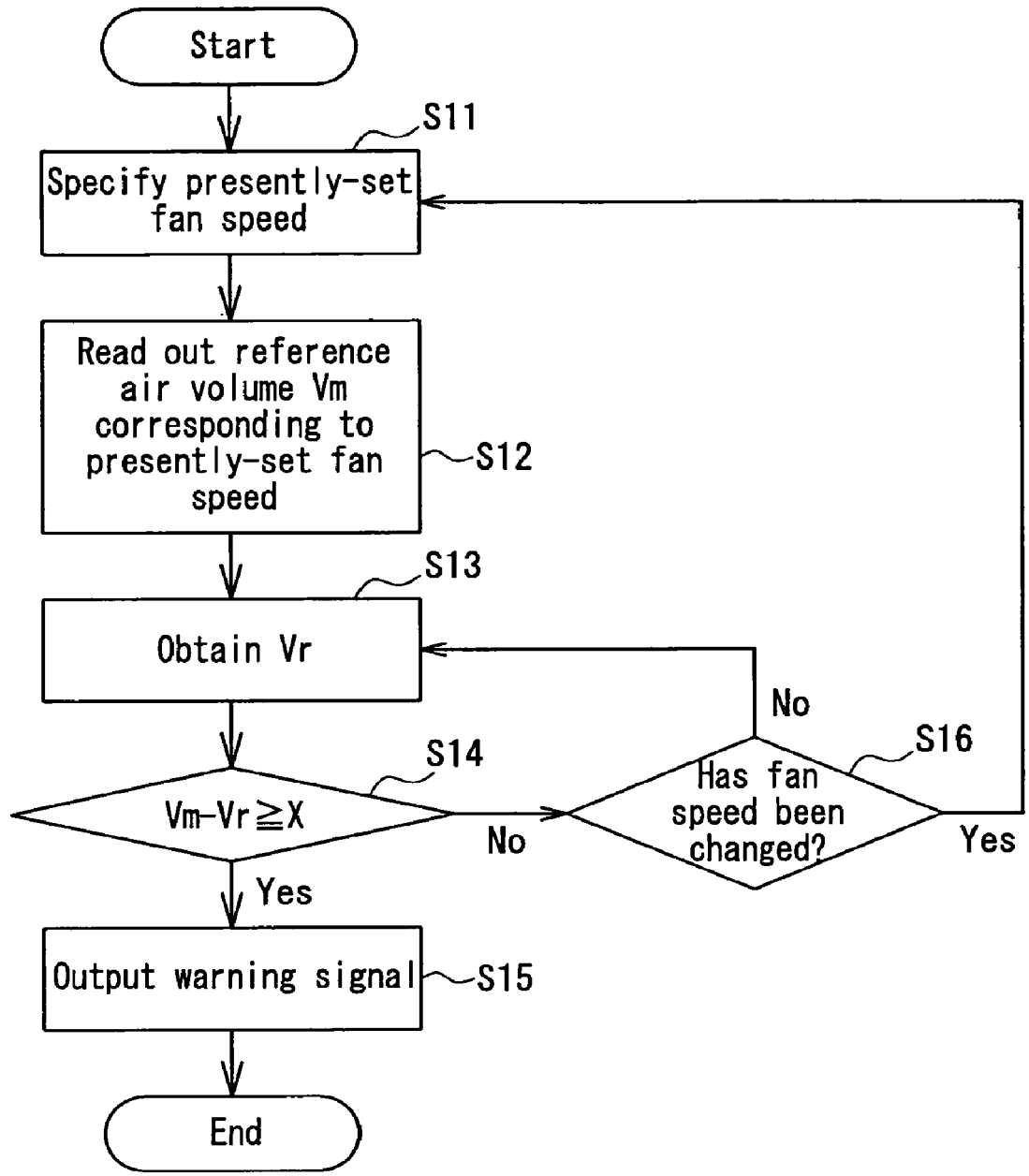
FIG. 5 is a flowchart showing an operation of a control device constituting the cooling device in Embodiment 2 of the present invention.

As shown in FIG. 5, the judging portion 31 first specifies a presently-set fan speed from the latest fan speed indicating signal outputted to the motor driving portion 34 (Step S11). Next, the judging portion 31 reads out, the reference air volume Vm corresponding to the fan speed specified in Step S11 from the memory portion 32 (Step S12).

Subsequently, the judging portion 31 obtains a present air volume Vr based on the signal outputted from the air volume measuring portion 33 (Step S13). Further, the judging portion 31 calculates the difference between the reference air volume Vm and the present air volume Vr and judges whether the calculated difference is equal to or larger than a preset tolerance value X (Step S14).

If the calculated difference is judged not to be equal to or larger than X in Step S14, the judging portion 31 judges whether the fan speed has been changed (Step S16). If it has, the judging portion 31 executes Step S11 again. If not, the judging portion 31 executes Step S13 again. It should be noted that the re-execution of Step S11 or S13 following Step S16 can be carried out after a certain time period.

On the other hand, if the calculated difference is judged to be equal to or larger than X in Step S14, the judging portion 31 judges that there is an anomaly in the supply air volume, and outputs a warning signal to ECU (not shown) of the vehicle as shown in FIG. 4 (Step S15). When the warning signal is outputted, the ECU of the vehicle warns a driver with a liquid crystal display attached to a meter panel or the like or a warning lamp in the vehicle, for example.

As described above, the cooling device and the power supply in Embodiment 2 monitor an anomaly in the supply air volume by measuring the actual volume of the air supplied to the inner part of the battery case 12 (the supply air volume). Thus, similarly to Embodiment 1, the cooling device and the power supply in Embodiment 2 also can sense a cooling air shortage before the temperature of the unit cell 11 rises. Consequently, it is possible to avoid the deterioration in performance of the unit cell 11 and the shortening of lifetime thereof due to temperature rise.

The reference value X can be set suitably according to an environment in which the vehicle is used. For example, if a limit is placed at the time when the present air volume Vr is 90% of the reference air volume Vm, it is appropriate to set X=0.11 Vm. Also, the tolerance value X may be set before the shipment of the product or every time the filter member 7 is replaced. Further, based on an indicator separately presented by a manufacturer, a user may set the tolerance value X arbitrarily.

Although the air volume sensor 36 is provided in the exhaust duct 2 in the example illustrated in FIG. 4, Embodiment 2 is not limited to this. The air volume sensor 36 also may be provided in the intake duct 1. In this case, the volume of the air that is to be supplied to the inner part of the battery case 12 is measured.

Embodiment 3

Now, a cooling device and a power supply in Embodiment 3 of the present invention will be described, with reference to FIGS. 6 and 7. The cooling device and the power supply in Embodiment 3 have configurations similar to those in Embodiment 2 shown in FIG. 4. Also, a memory portion in Embodiment 3 stores reference air volumes V1 to Vn for respective stages of the fan speed similarly to that in Embodiment 2.

However, Embodiment 3 is different from Embodiment 2 in the processing of the anomaly judgment in the supply air volume conducted by the judging portion. Also, the judging portion has a function of measuring how long the fan is operated from an arbitrary point in time. Moreover, in the case where the fan is driven at different fan speeds, the judging portion measures the operation time of the fan for each fan speed.

Figure 6:
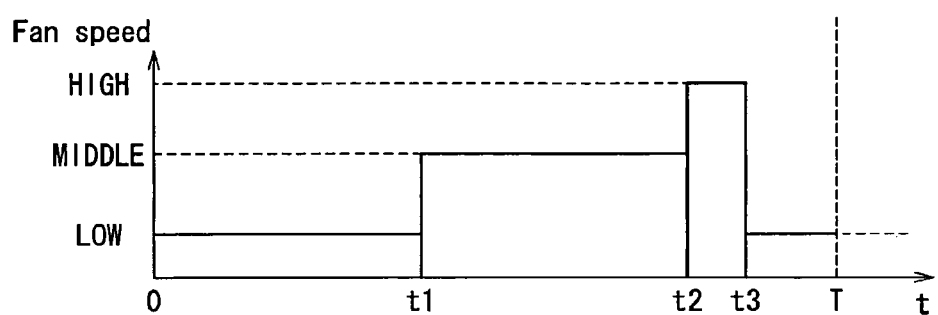
FIG. 6 illustrates an example of how a fan is operated.

FIG. 6 illustrates an example of how the fan is operated. In FIG. 6, the vertical axis indicates the fan speed, whereas the horizontal axis indicates time t. In FIG. 6, the origin of the time t is a point in time at which the fan starts to be operated after a new filter member is attached. Further, in FIG. 6, a present time of day is expressed by T.

Here, referring to FIG. 7, the processing of the anomaly judgment in the supply air volume in the control device in the case where the fan is driven as shown in FIG. 6 will be described. FIG. 7 is a flowchart showing an operation of the control device constituting the cooling device in Embodiment 3 of the present invention. The following description will refer to FIG. 4 used in Embodiment 2 where appropriate.

Figure 7:
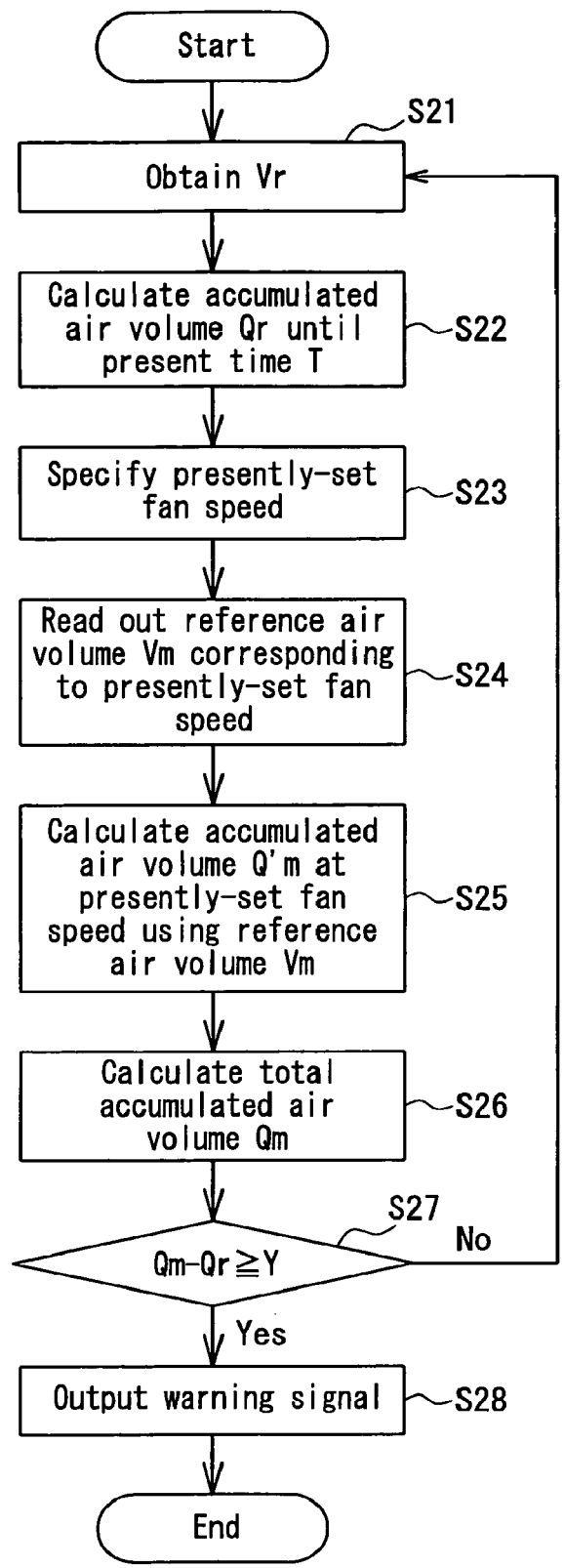
FIG. 7 is a flowchart showing an operation of a control device constituting a cooling device in Embodiment 3 of the present invention.

As shown in FIG. 7, the judging portion first obtains the present air volume Vr based on a signal outputted from an air volume measuring portion (Step S21). Next, using the obtained air volume Vr, the judging portion calculates an accumulated air volume Qr until the present time T by the equation (1) below (Step S22).

$$Qr = \int_0^T Vr\, dt \tag{1}$$

In the case where, prior to the present time T (at a time T'), an accumulated air volume Q'r from t=0 to t=T' already is calculated, Qr is calculated using the equation (2) below.

$$Qr = Q'r + \int_{T'}^T Vr\, dt \tag{2}$$

Next, the judging portion specifies a presently-set fan speed from the latest fan speed indicating signal outputted to the motor driving portion (Step S23). Further, the judging portion reads out the reference air volume Vm corresponding to the specified fan speed from the memory portion (Step S24). In the example illustrated in FIG. 6, the reference air volume V1 is read out.

Subsequently, the judging portion calculates an accumulated air volume Q'm from the read-out reference air volume Vm and an operation time from the time when the present fan speed is set (t=t3) to the time T (Step S25). In the example illustrated in FIG. 6, the reference air volume from t=t3 to t=T is V1, and the reference air volume does not vary during this time. Thus, the accumulated air volume Q'm is calculated in Step S25 by the equation (3) below.

$$Q'm = \int_{t3}^{T} V1 dt = V1 \times (T-t3) \tag{3}$$

Next, the judging portion calculates a total accumulated air volume Qm (Step S26). More specifically, in the case where the accumulated air volume when the fan is driven at a different fan speed set before the present fan speed is calculated already, this accumulated air volume and the accumulated air volume Q'm calculated in Step S25 are added together. The accumulated air volume obtained by this addition is used as the total accumulated air volume Qm.

On the other hand, in the case where only the present fan speed is set, the accumulated air volume Q'm calculated in Step S25 is used as the total accumulated air volume Qm. It should be noted that the total accumulated air volume Qm calculated as above corresponds to an accumulated air volume that is expected to be supplied to the battery case 12 from t=0 to t=T.

In the example illustrated in FIG. 6, by adding the accumulated air volume Q'm calculated in Step S25 to the accumulated air volume from t=0 to t=t3, the total accumulated air volume Qm from t=0 to t=T is obtained. In the example illustrated in FIG. 6, since the reference air volume at 0≦t≦t1 and t3≦t≦T is V1, that at t1≦t≦t2 is V2 and that at t2≦t≦t3 is V3, the total accumulated air volume Qm in Step S26 is calculated by the equation (4) below.

$$Qm = \int_{0}^{t1+(T-t3)} V1 dt + \int_{t1}^{t2} V2 dt + \int_{t2}^{t3} V3 dt \tag{4}$$
$$= V1 \times (t1 + T - t3) + V2 \times (t2 - t1) + V3 \times (t3 - t2)$$

Subsequently, the judging portion calculates the difference between the total accumulated air volume Qm calculated in Step S26 and the accumulated air volume Qr calculated in Step S22 and judges whether the calculated difference is equal to or larger than a preset tolerance value Y (Step S27).

If the calculated difference is judged not to be equal to or larger than Y in Step S27, the judging portion executes Step S21 again. It should be noted that the re-execution of Step S21 following Step S27 can be carried out after a certain time period.

On the other hand, if the calculated difference is judged to be equal to or larger than Y in Step S27, the judging portion judges that there is an anomaly in the supply air volume, and outputs a warning signal to the ECU (not shown) of the vehicle (Step S28). When the warning signal is outputted, the ECU of the vehicle warns a driver with a liquid crystal display attached to a meter panel or the like or a warning lamp in the vehicle, for example. Incidentally, the reference value Y can be set suitably according to an environment in which the vehicle is used.

As described above, the cooling device and the power supply in Embodiment 3 monitor an anomaly in the supply air volume by comparing the expected value and the actual measured value of the accumulated air volume of the air supplied to the inner part of the battery case 12. Thus, similarly to Embodiment 1, the cooling device and the power supply in Embodiment 3 also can sense a cooling air shortage before the temperature of the unit cell 11 rises. Consequently, it is possible to avoid the deterioration in the performance of the unit cell 11 and the shortening of the lifetime thereof due to temperature rise.

Embodiment 4

Figure 8:
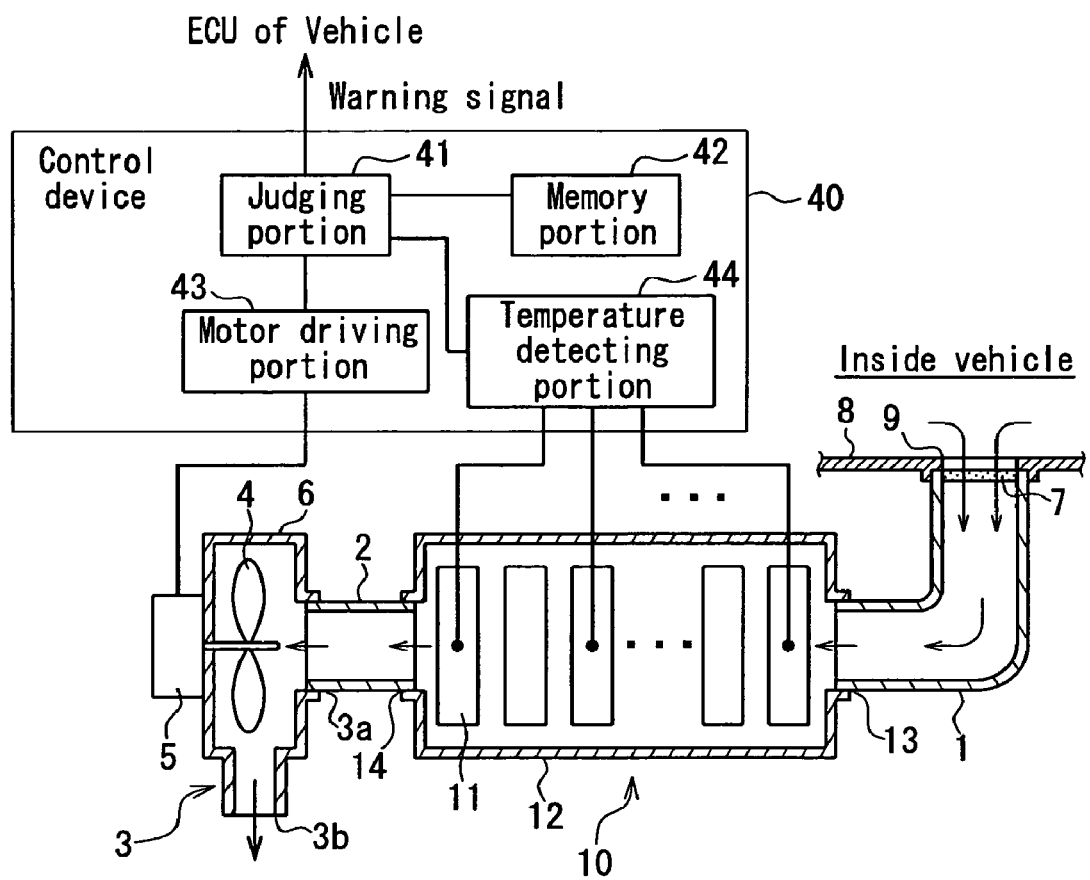
FIG. 8 is a sectional view showing a schematic configuration of a cooling device and a power supply in Embodiment 4 of the present invention.

Now, a cooling device and a power supply in Embodiment 4 of the present invention will be described, with reference to FIGS. 8 and 9. FIG. 8 is a sectional view showing a schematic configuration of the cooling device and the power supply in Embodiment 4 of the present invention.

As shown in FIG. 8, similarly to Embodiments 1 to 3, the power supply in Embodiment 4 also includes a battery pack 10 and a cooling device for supplying a cooling air into the battery pack 10. Also, the cooling device includes an intake duct 1, an exhaust duct 2, a fan unit 3 and a control device 40 similarly to Embodiment 1.

The control device 40 includes a judging portion 41, a memory portion 42, a motor driving portion 43 and a temperature detecting portion 44 similarly to Embodiments 1 to 3. With this configuration, the control device 40 switches the voltage applied to a motor 5 between multiple stages according to the temperature of a unit cell 11 so as to adjust the fan speed of a fan 4 in stages.

Further, similarly to the memory portion illustrated in Embodiments 2 and 3, the memory portion 42 stores reference air volumes V1 to Vn for respective stages of the fan speed. The reference air volume actually is measured similarly to Embodiments 2 and 3. Also, the judging portion 41 has a function of measuring how long the fan 4 is operated from an arbitrary point in time similarly to the judging portion illustrated in Embodiment 3. In the case where the fan 4 is driven at different fan speeds, the judging portion 41 measures the operation time of the fan 4 for each fan speed.

However, in Embodiment 4, the memory portion 42 further stores a reference accumulated air volume Qx. In addition, the judging portion 41 carries out an anomaly judgment in a supply air volume using the reference accumulated air volume Qx, which is a different processing from that conducted by the judging portion illustrated in Embodiments 1 to 3.

Herein, how to calculate the reference accumulated air volume Qx will be explained. In Embodiment 4, an unused filter member 7 first is provided in the intake duct 1. Next, the fan 4 is driven at a constant arbitrary fan speed. Further, the volume of the air supplied to the inner part of a battery case 12 is measured actually from the time when the fan 4 starts to be driven. In this case, the air volume can be measured using an air volume measuring device placed in the intake duct 1 or the exhaust duct 2.

When the fan 4 is operated for at least a certain time period, the filter member 7 becomes clogged gradually, so that the measured air volume decreases gradually. Here, a point in time is identified at which the present air volume becomes considerably smaller than the air volume at the driving start time due to the clogging of the filter member 7 and any more decrease in the air volume is expected to raise the temperature of the unit cell 11. Then, an operation time Tx of the fan 4 from the driving start time to that point in time is determined. More specifically, it is appropriate to identify a point in time at which the present air volume becomes 80% or smaller, preferably 70% to 80%, of the air volume at the driving start time.

Next, the determined operation time Tx and an air volume Vx(t) from the driving start time to the above-noted point in time are substituted into the equation (5) below. As a result, the reference accumulated air volume Qx is calculated. The calculated reference accumulated air volume Qx corresponds to an accumulated air volume of the air supplied to the battery case 12 until the filter member becomes clogged considerably. The reference accumulated air volume Qx serves as an indicator of when to replace or clean the filter member 7. Thus, in the case where a total accumulated air volume exceeds the reference accumulated air volume, the temperature of the battery is likely to rise so much that the performance of the unit cell 11 is deteriorated and the lifetime thereof is shortened.

$$Qx = \int_0^{Tx} Vx(t)dt \quad (5)$$

Incidentally, the cooling device is mounted on a hybrid car. Therefore, it is preferable that the above-described step of calculating the reference accumulated air volume is carried out in the same environment as that in the case where the cooling device actually is installed in the hybrid car. More specifically, the power supply including the cooling device is placed under a constant environmental condition, for example, in a laboratory where the suspended particles of dust are kept constant in the range of 0.02 mg/m$^3$ to 0.1 mg/m$^3$, the temperature is kept constant in the range of 20° C. to 30° C. and the humidity is kept constant in the range of 40% to 60%, and the reference accumulated air volume is calculated. As the battery pack constituting the power supply, a battery pack used in an actual vehicle or that having an equivalent performance is used.

Now, referring to FIG. 9, the processing of an anomaly judgment in the supply air volume in the control device 40 will be described. FIG. 9 is a flowchart showing an operation of the control device constituting the cooling device in Embodiment 4 of the present invention. The following description will refer to FIG. 8 where appropriate.

Figure 9:
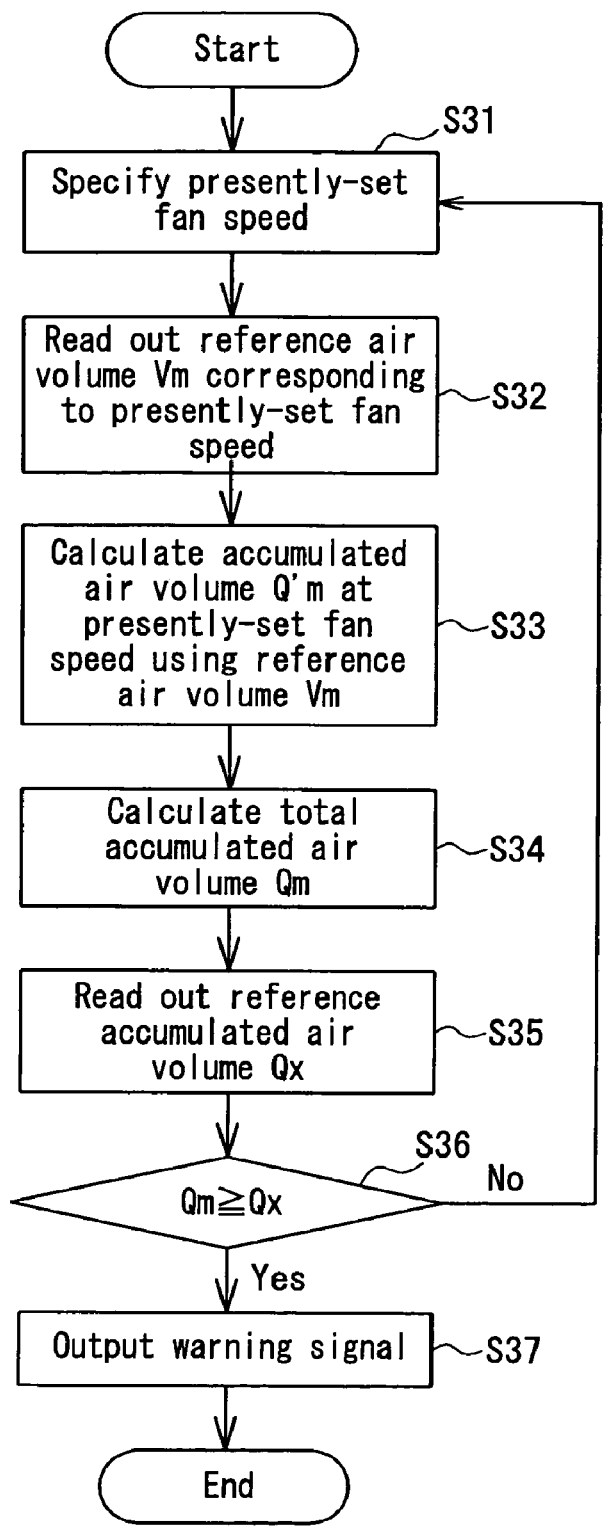
FIG. 9 is a flowchart showing an operation of a control device constituting the cooling device in Embodiment 4 of the present invention.

As shown in FIG. 9, the judging portion 41 first specifies a presently-set fan speed from the latest fan speed indicating signal outputted to the motor driving portion 43 (Step S31). Next, the judging portion 41 reads out a reference air volume Vm corresponding to the specified fan speed from the memory portion 42 (Step S32).

Subsequently, the judging portion 41 calculates an accumulated air volume Q'm from the read-out reference air volume Vm and an operation time from the time when the present fan speed is set to the present time T (Step S33). It should be noted that the accumulated air volume Q'm is calculated in Step S33 similarly to Step S24 in Embodiment 3.

Next, the judging portion 41 calculates a total accumulated air volume Qm (Step S34). More specifically, in the case where the accumulated air volume when the fan is driven at a different fan speed set before the present fan speed is calculated already, this accumulated air volume and the accumulated air volume Q'm calculated in Step S33 are added together. The accumulated air volume obtained by this addition is used as the total accumulated air volume Qm. In the case where only the present fan speed is set, the accumulated air volume Q'm calculated in Step S33 is used as the total accumulated air volume Qm. It should be noted that the total accumulated air volume Qm is calculated in Step S34 similarly to Step S26 in Embodiment 3.

Then, the judging portion 41 reads out a reference accumulated air volume Qx from the memory portion 42 (Step S35). Thereafter, the judging portion 41 compares the total accumulated air volume Qm calculated in Step S34 and the reference accumulated air volume Qx read out in Step S35 and judges whether the total accumulated air volume Qm is equal to or larger than the reference accumulated air volume Qx (Step S36).

If the total accumulated air volume Qm is judged not to be equal to or larger than the reference accumulated air volume Qx (the total accumulated air volume Qm is smaller than the reference accumulated air volume Qx) in Step S36, the judging portion 41 executes Step S31 again. It should be noted that the re-execution of Step S31 following Step S36 can be carried out after a certain time period.

On the other hand, if the total accumulated air volume Qm is judged to be equal to or larger than the reference accumulated air volume Qx in Step S36, the judging portion 41 judges that there is an anomaly in the supply air volume, and outputs a warning signal to the ECU (not shown) of the vehicle (Step S37). When the warning signal is outputted, the ECU of the vehicle warns a driver with a liquid crystal display attached to a meter panel or the like or a warning lamp in the vehicle, for example.

As described above, the cooling device and the power supply in Embodiment 4 monitor an anomaly in the supply air volume based on the reference accumulated air volume Qx serving as the indicator of when to replace or clean the filter member 7. Thus, similarly to Embodiment 1, the cooling device and the power supply in Embodiment 4 also can sense a cooling air shortage before the temperature of the unit cell 11 rises. Consequently, it is possible to avoid the deterioration in the performance of the unit cell 11 and the shortening of the lifetime thereof due to temperature rise.

Incidentally, in Embodiments 1 to 4 described above, the kind, size, material and performance of the filter member 7 are not particularly limited. However, if an object to be cooled by the cooling device is the battery pack 10 mounted on a vehicle such as a hybrid car and the air inlet 9 is provided in the interior material 8 of the vehicle, it is preferable that the filter member 7 is formed of a polypropylene (PP) resin. Further, in the case where the air inlet 9 is not provided in the interior material 8 of the vehicle, it also is possible to use the filter member 7 formed of steel wool.

Although the air inlet 9 is provided in the vehicle interior in Embodiments 1 to 4, the present invention is not limited to this. The air inlet 9 also can be provided in a vehicle exterior, for example. Moreover, although the fan unit 3 serving as the air supply system is placed on the air exhausting side in Embodiments 1 to 4, the present invention is not limited to this. The fan unit 3 also can be placed on the air supply side.

The cooling device and the power supply in the present invention form a part of a vehicle on which a battery for running is mounted, such as a hybrid car, and have an industrial applicability.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A cooling device for cooling a battery contained in a battery case and mounted on a vehicle, the cooling device comprising:

an air supply channel achieving fluid communication between a vehicle interior or an outside of the vehicle and an inner part of the battery case;

an air supply system for supplying a volume of air via the air supply channel to the inner part of the battery case;

a control system, the control system comprising a motor driving portion, a memory portion, and a judging portion;

an air volume measuring system for measuring the volume of the air supplied to the inner part of the battery case; and a filter member, the filter member being disposed so that only the air that has passed through the filter member is supplied to the inner part of the battery case;

wherein the air supply system comprises a fan and a motor for driving the fan, the motor driving portion switches a voltage applied to the motor between multiple stages according to an indication of the judging portion so as to adjust a fan speed of the fan in stages, the memory portion stores a reference air volume obtained in advance by measuring an actual volume of the air supplied to the inner part of the battery case when the fan is driven at each of the stages of the fan speed, and the judging portion calculates a difference between the reference air volume corresponding to the fan speed of the fan at constant time intervals or at all times and the volume of air measured by the air volume measuring system at that time and, when the calculated difference is equal to or larger than a preset tolerance value, judges that there is an anomaly in the volume of the air supplied to the battery case, and wherein the reference air volume is obtained by measuring an actual volume of the air supplied to the battery case when the fan is driven while an unused filter member is provided.

2. A power supply comprising:

a battery mounted on a vehicle; and a cooling device for cooling the battery;

wherein the battery comprises a plurality of unit cells and a battery case containing the plurality of unit cells, the cooling device comprises an air supply channel achieving fluid communication between a vehicle interior or an outside of the vehicle and an inner part of the battery case, an air supply system for supplying a volume of air via the air supply channel to the inner part of the battery case, the air supply system including a fan and a motor for driving the fan, a control system including a motor driving portion, a memory portion, and a judging portion, an air volume measuring system for measuring the volume of the air supplied to the inner part of the battery case; and a filter member, the filter member being disposed so that only the air that has passed through the filter member is supplied to the inner part of the battery case;

wherein, the motor driving portion switches a voltage applied to the motor between multiple stages according to an indication of the judging portion so as to adjust a fan speed of the fan in stages, the memory portion stores a reference air volume obtained in advance by measuring an actual volume of the air supplied to the inner part of the battery case when the fan is driven at each of the stages of the fan speed, and the judging portion determines an operation time of the fan, calculates a first accumulated air volume using the reference air volume and the operation time of the fan, calculates a second accumulated air volume using the air volume measured by the air volume measuring system and the operation time of the fan, calculates a difference between the first accumulated air volume and the second accumulated air volume and, when the calculated difference is equal to or larger than a preset range, judges that there is an anomaly in the volume of the air supplied to the battery case, and wherein the reference air volume is obtained by measuring an actual volume of the air supplied to the battery case when the fan is driven while an unused filter member is provided.

* * * * *